US010114787B2

(12) United States Patent
Amarilio et al.

(10) Patent No.: US 10,114,787 B2
(45) Date of Patent: Oct. 30, 2018

(54) DEVICE IDENTIFICATION GENERATION IN ELECTRONIC DEVICES TO ALLOW EXTERNAL CONTROL OF DEVICE IDENTIFICATION FOR BUS COMMUNICATIONS IDENTIFICATION, AND RELATED SYSTEMS AND METHODS

(71) Applicant: QUALCOMM Incorporated, San Diego, CA (US)

(72) Inventors: Lior Amarilio, Yokneam (IL); Yossi Amon, Kiryat Tivon (IL); Nir Gerber, Haifa (IL); Assaf Shacham, Zichron Yaakov (IL)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 14/609,488

(22) Filed: Jan. 30, 2015

(65) Prior Publication Data
US 2015/0220475 A1 Aug. 6, 2015

Related U.S. Application Data

(60) Provisional application No. 61/935,115, filed on Feb. 3, 2014, provisional application No. 61/935,134, filed on Feb. 3, 2014.

(51) Int. Cl.
G06F 13/42 (2006.01)
G06F 13/364 (2006.01)
(Continued)

(52) U.S. Cl.
CPC ........ G06F 13/4221 (2013.01); G06F 13/364 (2013.01); G06F 13/409 (2013.01);
(Continued)

(58) Field of Classification Search
CPC .. G06F 13/364; G06F 13/4221; G06F 13/409; G06F 13/4282; G06F 13/4291;
(Continued)

(56) References Cited

U.S. PATENT DOCUMENTS 5,603,086 A * 2/1997 Cree ..................... H04W 84/08
340/9.1
6,088,726 A * 7/2000 Watanabe ............... H04L 12/42
709/220
(Continued)

FOREIGN PATENT DOCUMENTS

CN 101727099 A 6/2010
CN 102147782 A 8/2011
(Continued)

OTHER PUBLICATIONS

Author Unknown, "MIPI SoundWire Master Controller IP," MIPI Datasheet, Cadence, Sep. 2014, 3 pages.
(Continued)

Primary Examiner — Nimesh G Patel
(74) Attorney, Agent, or Firm — Withrow & Terranova, PLLC

(57) ABSTRACT

Device identification generation in electronic devices to allow external control, such as selection or reprogramming, of device identification for bus communications identification, is disclosed. In this manner, device identifications of electronic devices coupled to a common communications bus in a system can be selected or reprogrammed to ensure they are unique to avoid bus communications collisions. In certain aspects, to select or reprogram a device identification in an electronic device, an external source can be electrically coupled to the electronic device. The external source closes a circuit with a device identification generation circuit in the electronic device. The closed circuit provides a desired electrical characteristic detectable by the device identifica-
(Continued)

tion generation circuit. The device identification generation circuit is configured to generate a device identification as a function of the detected electrical characteristics of the closed circuit from the external source.

21 Claims, 14 Drawing Sheets

(51) Int. Cl.
  *G06F 13/40* (2006.01)
  *H04L 29/12* (2006.01)
(52) U.S. Cl.
  CPC ...... *G06F 13/4282* (2013.01); *G06F 13/4291* (2013.01); *H04L 61/2038* (2013.01); *H04L 61/2046* (2013.01); *H04L 61/2092* (2013.01); *H04L 61/3005* (2013.01)
(58) Field of Classification Search
  CPC ............. H04L 61/2038; H04L 61/2046; H04L 61/2092; H04L 61/3005
  See application file for complete search history.

(56) References Cited

U.S. PATENT DOCUMENTS

| | | | |
|---|---|---|---|
| 6,246,696 B1* | 6/2001 | Yamaguchi | H04L 29/06 370/328 |
| 6,629,172 B1 | 9/2003 | Andersson et al. | |
| 7,827,330 B2 | 11/2010 | Richards et al. | |
| 7,893,699 B2 | 2/2011 | Koerner | |
| 8,543,740 B2 | 9/2013 | Lotzenburger et al. | |
| 8,688,865 B2 | 4/2014 | Luo | |
| 8,825,908 B2 | 9/2014 | Hueber | |
| 9,436,633 B2* | 9/2016 | Segev | G06F 13/36 |
| 2007/0233917 A1* | 10/2007 | Pyeon | G06F 13/4291 710/100 |
| 2007/0250648 A1 | 10/2007 | Picard et al. | |
| 2008/0155219 A1* | 6/2008 | Pyeon | G06F 13/4291 711/170 |
| 2009/0240854 A1* | 9/2009 | Cedar | G06F 12/0653 710/104 |
| 2010/0306431 A1 | 12/2010 | Adkins et al. | |
| 2011/0119405 A1 | 5/2011 | Parr et al. | |
| 2012/0072626 A1 | 3/2012 | Scott et al. | |
| 2012/0239841 A1 | 9/2012 | Trifonov et al. | |
| 2012/0303836 A1 | 11/2012 | Ngo et al. | |
| 2013/0132626 A1* | 5/2013 | Furlan | G06F 13/36 710/110 |
| 2014/0337552 A1 | 11/2014 | Evans | |

FOREIGN PATENT DOCUMENTS

| | | |
|---|---|---|
| EP | 2458509 A1 | 5/2012 |
| EP | 2688258 A1 | 1/2014 |

OTHER PUBLICATIONS

Bossart, Pierre-Louis et al., "SoundWire™: a new MIPI standard audio interface," Convention e-Brief 172, Audio Engineering Society 137th Convention, Oct. 9-12, 2014, Los Angeles, CA, 4 pages.
Lefkin, Peter et al., "MIPI SoundWire Overview," MIPI Alliance Webinar, Jan. 21, 2015, 64 pages, Retrieved from: http://mipi.org/sites/default/files/tutorials/MIPI-SoundWire-webinar-20150121-final.pdf.
Second Written Opinion for PCT/US2015/014067, dated Feb. 3, 2016, 12 pages.
International Preliminary Report on Patentability for PCT/US2015/014067, dated May 11, 2016, 36 pages.
International Search Report and Written Opinion for PCT/US2015/014067, dated Apr. 23, 2015, 11 pages.

* cited by examiner

DEVICE IDENTIFICATION GENERATION IN ELECTRONIC DEVICES TO ALLOW EXTERNAL CONTROL OF DEVICE IDENTIFICATION FOR BUS COMMUNICATIONS IDENTIFICATION, AND RELATED SYSTEMS AND METHODS

PRIORITY CLAIM

The present application claims priority to U.S. Provisional Patent Application Ser. No. 61/935,134 filed on Feb. 3, 2014, and entitled "DEVICE IDENTIFICATION GENERATION IN ELECTRONIC DEVICES TO ALLOW EXTERNAL CONTROL OF DEVICE IDENTIFICATION FOR BUS COMMUNICATIONS IDENTIFICATION, AND RELATED SYSTEMS AND METHODS," which is incorporated herein by reference in its entirety.

The present application also claims priority to U.S. Provisional Patent Application Ser. No. 61/935,115 filed on Feb. 3, 2014, and entitled "DEVICE IDENTIFICATION GENERATION IN ELECTRONIC DEVICES TO ALLOW EXTERNAL CONTROL OF DEVICE IDENTIFICATION FOR BUS COMMUNICATIONS IDENTIFICATION, AND RELATED SYSTEMS AND METHODS," which is incorporated herein by reference in its entirety.

BACKGROUND

I. Field of the Disclosure

The technology of the disclosure relates generally to electronic devices configured to communicate on a communications bus, and more particularly to electronic devices configured to communicate their identification information over the communications bus as part of a defined communications protocol to avoid bus collisions.

II. Background

Electronic devices, such as mobile phones and computer tablets as non-limiting examples, have proliferated throughout society supporting a myriad of uses. These electronic devices commonly include a microphone and speakers. Common microphones and speakers used in electronic devices have analog interfaces, requiring dedicated two (2) port wiring to connect each device. However, electronic devices are commonly starting to include multiple audio devices, such as multiple microphones and speakers. Thus, it may be desired to allow for a microprocessor or other control device in such electronic devices to be able to communicate audio data to multiple audio devices over a common communications bus. In this regard, it may also be desired to provide a defined communications protocol for transporting digital data relating to audio channels to different audio devices in an electronic device over the communications bus.

In this regard, FIG. 1 is a block diagram of an exemplary system 10 having one (1) master device 12 and four (4) slave devices 14(1)-14(4) communicatively coupled to a common communications bus 16 as electronic devices. The master device 12 communicates with the slave devices 14(1)-14(4) over the communications bus 16. Thus, in the system 10, a time division multiplexed (TDM) frame structure is used for transport of bitrate media streams over the communications bus 16 to avoid data collisions. The master device 12 allocates a transmission time slot to each of the slave devices 14(1)-14(4) for bus communications. Thus, the protocol requires that each of the slave devices 14(1)-14(4) is connected to the communications bus 16 be identified by the master device 12 through a device identification, also called a "Device_Id." For example, the Device_Id may have a specified bit length in the protocol, such as five (5) bits, for example. Identifying different Device_Ids of the slave devices 14(1)-14(4) allows the master device 12 to allocate different transmission time slots to each of the slave devices 14(1)-14(4) to avoid data collisions on the communications bus 16.

A Device_Id would be loaded into an electronic device by a manufacturer as a default device identification to be used to identify the electronic device. For example, as shown in FIG. 1, a Device_Id 26(1) can be loaded into the master device 12. Device_Ids 28(1)-28(4) can be loaded into the respective slave devices 14(1)-14(4). However, it is possible that the same Device_Id 28 could be loaded into different slave devices 14(1)-14(4). In this case, the slave devices 14(1)-14(4) having the same Device_Id 28 would be identified by the master device 12 with the same Device_Id 28 causing data collisions on the communications bus 16. One way to ensure that each slave device 14(1)-14(4) has a unique Device_Id 28(1)-28(4) is to ensure that each slave device 14(1)-14(4) is loaded with a unique Device_Id during production. Multiple slave devices manufactured by the same manufacturer may have the same device identification. Providing unique Device_Ids 28 would require a larger device identification storage facility, which may prohibitively increase costs of an otherwise low-cost device. Further, even if the slave devices 14(1)-14(4) are manufactured by different manufacturers, it may be difficult or not possible to guarantee that each manufacturer will employ unique device identification in their slave devices.

It is therefore desirable to provide unique device identifications for electronic devices provided in a communications system employing a common communications bus to allow unique identification of the slave electronic devices to avoid data collisions in a cost effective manner.

SUMMARY OF THE DISCLOSURE

Aspects disclosed in the detailed description include device identification generation in electronic devices to allow external control, such as selection or reprogramming, of device identification for bus communications identification. Related systems and methods are also disclosed. In this manner, device identifications of electronic devices coupled to a common communications bus in a system can be selected or reprogrammed to ensure the device identifications are unique to avoid bus communications collisions. For example, in a bus communications system, a bus communications protocol may require that electronic devices coupled thereto be identified by a master electronic device through the device identification. The device identification is used to control allocation of different transmission time slots to each of the slave devices to avoid data collisions on the communications bus. If two or more slave devices have the same device identification, the master device will allocate the same transmission time slot for such slave devices, thereby causing bus communications collisions.

In certain aspects disclosed herein, to select or reprogram the device identification in the electronic device, an external source is provided. As a non-limiting example, the electronic device whose device identification is selected or reprogrammed may be a slave device in a system. The external source can be electrically coupled to the electronic device to close a circuit with a device identification generation circuit in the electronic device. The circuit closed by the external source provides a desired electrical characteristic (e.g., a voltage, a resistance, a capacitance) that is detectable by the device identification generation circuit in the electronic device. The device identification generation circuit is configured to generate a device identification as a function of the detected electrical characteristics of the circuit closed by the external source. This allows the external source to externally select or reprogram the device identification of the electronic device to the desired device identification based on controlling the electrical characteristic of the closed circuit. Thus, entities other than the manufacturer of the electronic device (e.g., an aggregator) can control the external source to cause the device identification generation circuit within the electronic device to select or reprogram the device identification stored in its electronic device. In this manner, uniqueness of device identifications of slave devices coupled to a common communications bus in a system can be provided, if desired, to avoid bus communications collisions.

In this regard, in one aspect, an electronic device configured to reprogram its device identification is provided. The electronic device comprises a device identification port configured to be coupled to a communications bus. The electronic device also comprises a device identification generation circuit coupled to the device identification port. The device identification generation circuit is configured to detect an electrical characteristic of a communications bus signal received from the communications bus on the device identification port. The device identification generation circuit is also configured to generate a device identification based on the detected electrical characteristic. The device identification generation circuit is also configured to store the generated device identification in a device identification memory.

In another aspect, an electronic device configured to reprogram its device identification is provided. The electronic device comprises a device identification means configured for coupling to a communications bus. The electronic device also comprises a device identification generation means coupled to the device identification means. The device identification generation means comprises means for detecting an electrical characteristic of a communications bus signal received from the communications bus on the device identification means. The device identification generation means also comprises means for generating a device identification based on the detected electrical characteristic. The device identification generation means also comprises means for storing the generated device identification in a device identification memory.

In another aspect, a method for an electronic device to reprogram its device identification is provided. The method comprises detecting an electrical characteristic of a communications bus signal received from a communications bus on a device identification port coupled to the communications bus. The method also comprises generating a device identification based on the detected electrical characteristic of the communications bus signal. The method also comprises storing the generated device identification in a device identification memory.

In another aspect, a bus communications system for allowing a slave device coupled to a communications bus to reprogram its device identification is provided. The bus communications system comprises a communications bus comprised of a data line and a clock line. The bus communications system also comprises a master device comprised of a master data port and a master clock port, the master device coupled to the communications bus by the master data port coupled to the data line and the master clock port coupled to the clock line. The bus communications system also comprises a plurality of slave devices. Each of the plurality of slave devices comprises a data port and a clock port coupled to the communications bus, wherein at least one of the data port and the clock port also comprise a device identification port. The data port is coupled to the data line of the communications bus, and the clock port is coupled to the clock line of the communications bus. Each of the plurality of slave devices also comprises a device identification generation circuit coupled to the device identification port. The device identification generation circuit is configured to detect an electrical characteristic of a communications bus signal received from the communications bus on the device identification port. The device identification generation circuit is also configured to generate a device identification based on the detected electrical characteristic. The device identification generation circuit is also configured to store the generated device identification in a device identification memory.

DETAILED DESCRIPTION

Figure 1:
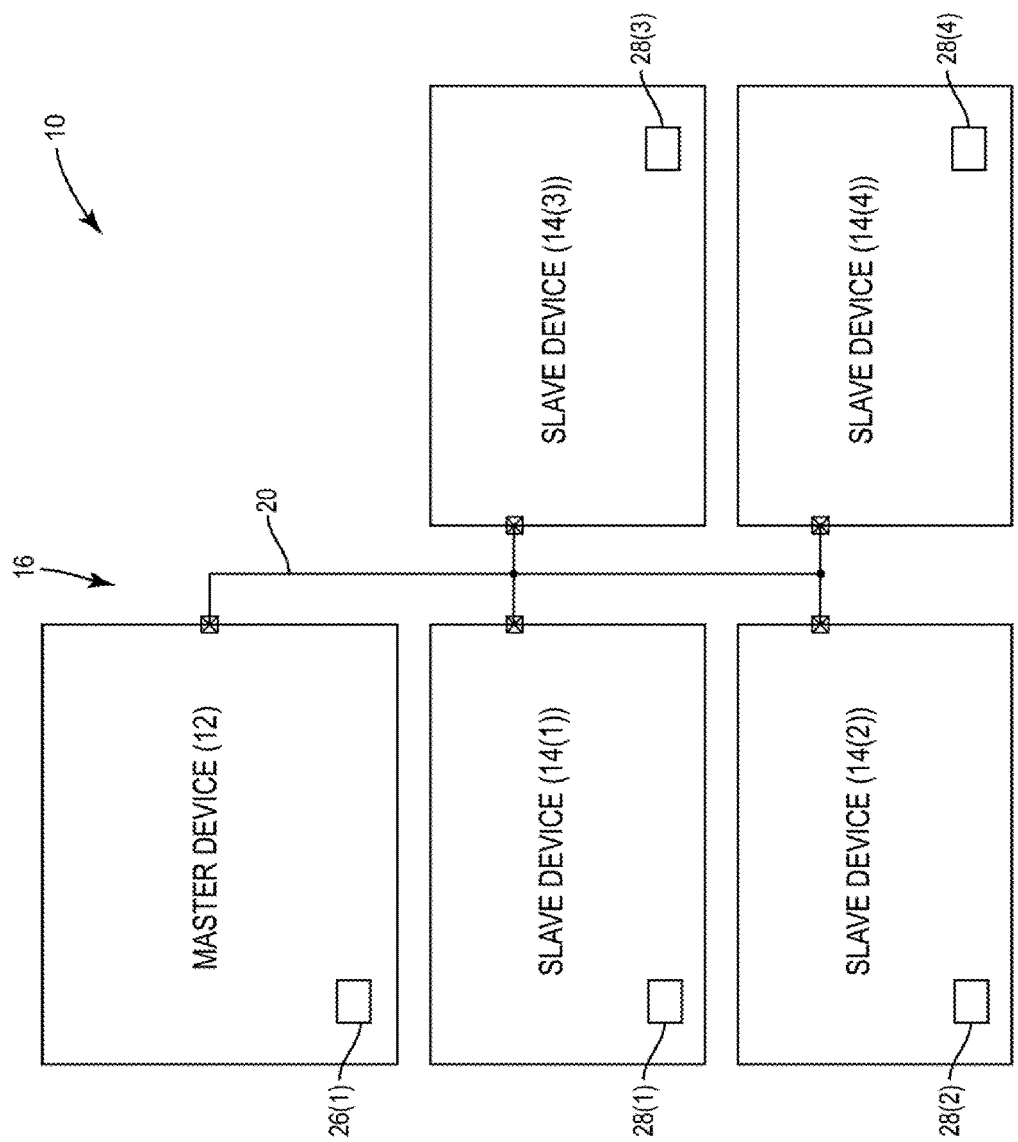
FIG. 1 is a block diagram of a system as an exemplary electronic device communications system with one (1) master device and four (4) slave devices communicatively coupled to a communications bus.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include device identification generation in electronic devices to allow external control, such as selection or reprogramming, of device identification for bus communications identification. Related systems and methods are also disclosed. In this manner, device identifications of electronic devices coupled to a common communications bus in a system can be selected or reprogrammed to ensure the device identifications are unique to avoid bus communications collisions. For example, in a bus communications system, a bus communications protocol may require that electronic devices coupled thereto be identified by a master electronic device through the device identification. The device identification is used to control allocation of different transmission time slots to each of the slave devices to avoid data collisions on the communications bus. If two or more slave devices have the same device identification, the master device will allocate the same transmission time slot for such slave devices, thereby causing bus communications collisions.

In certain aspects disclosed herein, to select or reprogram the device identification in the electronic device, an external source is provided. As a non-limiting example, the electronic device whose device identification is selected or reprogrammed may be a slave device in a system. The external source can be electrically coupled to the electronic device to close a circuit with a device identification generation circuit in the electronic device. The circuit closed by the external source provides a desired electrical characteristic (e.g., a voltage, a resistance, a capacitance) that is detectable by the device identification generation circuit in the electronic device. The device identification generation circuit is configured to generate a device identification as a function of the detected electrical characteristics of the circuit closed by the external source. This allows the external source to externally select or reprogram the device identification of the electronic device to the desired identification based on controlling the electrical characteristic of the closed circuit. Thus, entities other than the manufacturer of the electronic device (e.g., an aggregator) can control the external source to cause the device identification generation circuit within the electronic device to select or reprogram the device identification stored in its electronic device. In this manner, uniqueness of device identifications of slave devices coupled to a common communications bus in a system can be provided, if desired, to avoid bus communications collisions.

Figure 2B:
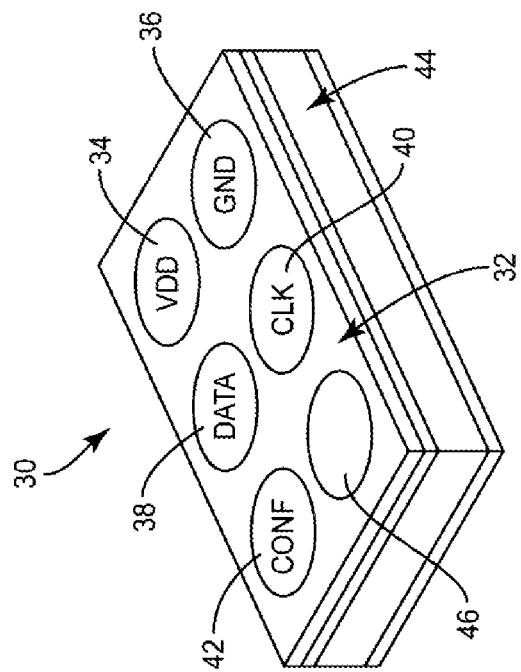
FIG. 2B is a bottom perspective view of the exemplary electronic device in FIG. 2A showing an exemplary pin-out configuration.
Figure 2A:
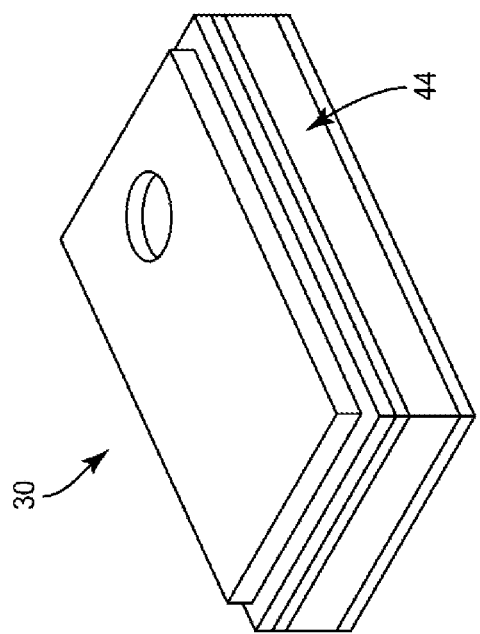
FIG. 2A is a top perspective view of an exemplary electronic device as an electronic device that can be coupled to a communications bus.

In this regard, FIG. 2A is a top perspective view of an exemplary electronic device 30 in the form of a bus communications device, which is an audio electronic device in this example. The electronic device 30 is configured to receive and communicate protocol-based messages. The electronic device 30 may be provided as a slave device in a system having a communications bus. FIG. 2B is a bottom perspective view of the exemplary electronic device 30 in FIG. 2A showing an exemplary pin-out configuration. As illustrated in FIG. 2B, the electronic device 30 includes external pins 32 that allow for electrical connections to be made to the electronic device 30. For example, an external power source (not shown) may be coupled to a power pin 34 and a ground pin 36 to provide power to the electronic device 30 for its operation. The electronic device 30 in FIG. 2B also includes a DATA pin 38 as a data port and a CLOCK pin 40 as a clock port, each configured to be coupled to a respective data line and clock line of a communications bus to allow the electronic device 30 to receive audio data. For example, the DATA pin 38 and the CLOCK pin 40 of the electronic device 30 are configured to be coupled to a data line and a clock line of a communications bus, such as the communications bus 16 in FIG. 1. Also, a conference pin 42 may be provided in the electronic device 30 as a legacy pin to allow a connection to an external pull-up or pull-down resistor (not shown) to configure the electronic device 30 to be either a left or right microphone for stereo systems. The audio data directed on a communications bus to the DATA pin 38 of the electronic device 30 will thus be the audio of either a left or right audio channel, based on the value of the external pull-up or pull-down resistor connected to the conference pin 42.

With continuing reference to FIGS. 2A and 2B, it may be desired to allow for the electronic device 30 to be identified when connected to a communications bus. In this regard, the electronic device 30 includes an internal device identification memory 44, also referred to herein as a "Device_Id 44." The Device_Id 44 is a storage facility that is capable of storing an identification number or other indicia. For example, the Device_Id 44 may be comprised of a plurality of bits that are configured to provide a binary number as a device identification. The electronic device 30 may also contain multiple device identifications. However, it is possible that the Device_Id 44 could be loaded with the same device identification as another electronic device coupled to the same communications bus as the electronic device 30. In this case, as discussed above, the electronic device 30 having the same Device_Id 44 as another electronic device coupled to a communications bus would be identified with the same device identification, thereby causing data collisions on the communications bus. One way to ensure that the electronic device 30 has a unique Device_Id 44 is to have the ability to reprogram the default Device_Id 44 with a unique device identification, if desired.

Figure 3:
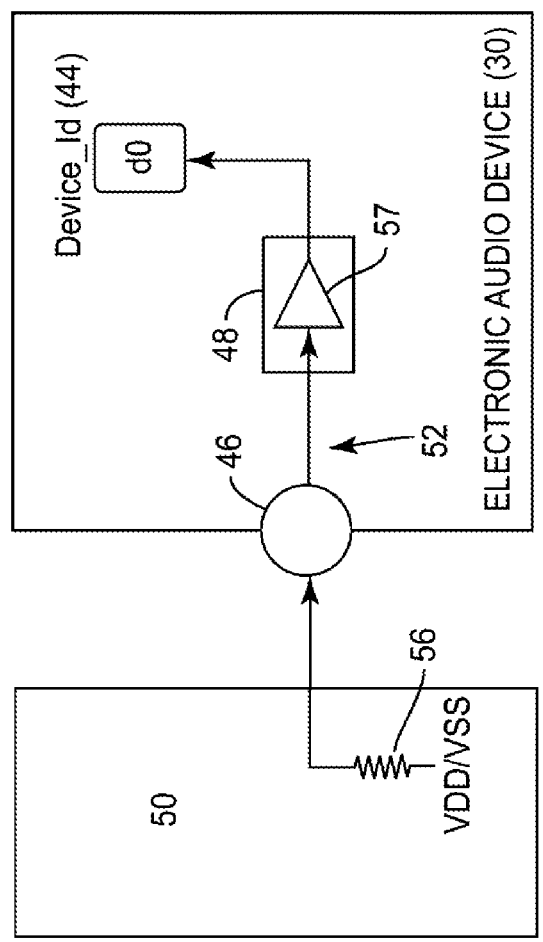
FIG. 3 is a schematic diagram of the electronic device of FIGS. 2A and 2B with a device identification generation circuit configured to generate a device identification based on an external voltage source applied to an external pin of the electronic device, and program the new generated device identification in the electronic device.

In this regard, as illustrated in FIGS. 2B and 3, the electronic device 30 is configured with an extra external pin 46 to provide a device identification port to allow the Device_Id 44 to be reprogrammed. In this example, the extra external pin 46 is a device identification pin. As illustrated in FIG. 3, the Device_Id 44 in the electronic device 30 in this example is one (1) binary bit in length as bit d0. Thus, the electronic device 30 can be programmed with two (2) different device identifications as the Device_Id 44 (i.e., $2^1=2$). To allow the Device_Id 44 of the electronic device 30 to be reprogrammed, the electronic device 30 includes a device identification generation circuit 48. The device identification generation circuit 48 is coupled to the extra external pin 46. An external source 50, which is an external resistor 56 in this example, is connected to the extra external pin 46 to form a circuit 52 with the device identification generation circuit 48. The circuit 52 formed by the external resistor 56 provides a desired resistance that is detectable by the device identification generation circuit 48 in the electronic device 30. The device identification generation circuit 48 includes a buffer circuit 57 that is configured to generate a digital value of '1' or '0' based on the resistance level of the external resistor 56. In this manner, the external source 50 can externally program or reprogram the Device_Id 44 of the electronic device 30 to the desired device identification based on the resistance of the external resistor 56. Also, as another example, the device identification generation circuit 48 could also be configured to reprogram a device identification in the electronic device 30 selected from a plurality of device identifications provided in the electronic device 30.

Thus, by using the external source 50, entities other than the manufacturer of the electronic device 30, such as an aggregator for example, can control the external source 50 to cause the device identification generation circuit 48 within the electronic device 30 to program or reprogram the Device_Id 44. In this manner, uniqueness of the Device_Id 44 of the electronic device 30 can be controlled when employed in a system employing a common communications bus that identifies the electronic device 30 to avoid bus communications collisions.

In the electronic device 30 in FIG. 3, the extra external pin 46 is provided to couple the external source 50 to the device identification generation circuit 48. However, this solution requires that an external pin be provided on the electronic device 30. It may be undesirable to add an external pin to an electronic device to allow for an external source to be able to reprogram a device identification in the audio device. One technique to avoid adding an extra external pin to an electronic device while being able to reprogram its device identification using an external source is to couple the external source to another existing pin of the audio device. For example, an external source could be coupled to the conference pin 42 of the electronic device 30, wherein the conference pin 42 is repurposed as the device identification port, as illustrated in FIG. 2B. In this example, the conference pin 42 provides a device identification pin. The conference pin 42 may be provided on the electronic device 30 to be configured to be coupled to a pull-up or pull-down resistor to be used as a device identification port to reprogram a device identification in the electronic device 30, instead of being used for its original purpose to detect either a left or right audio channel.

Figure 4A:
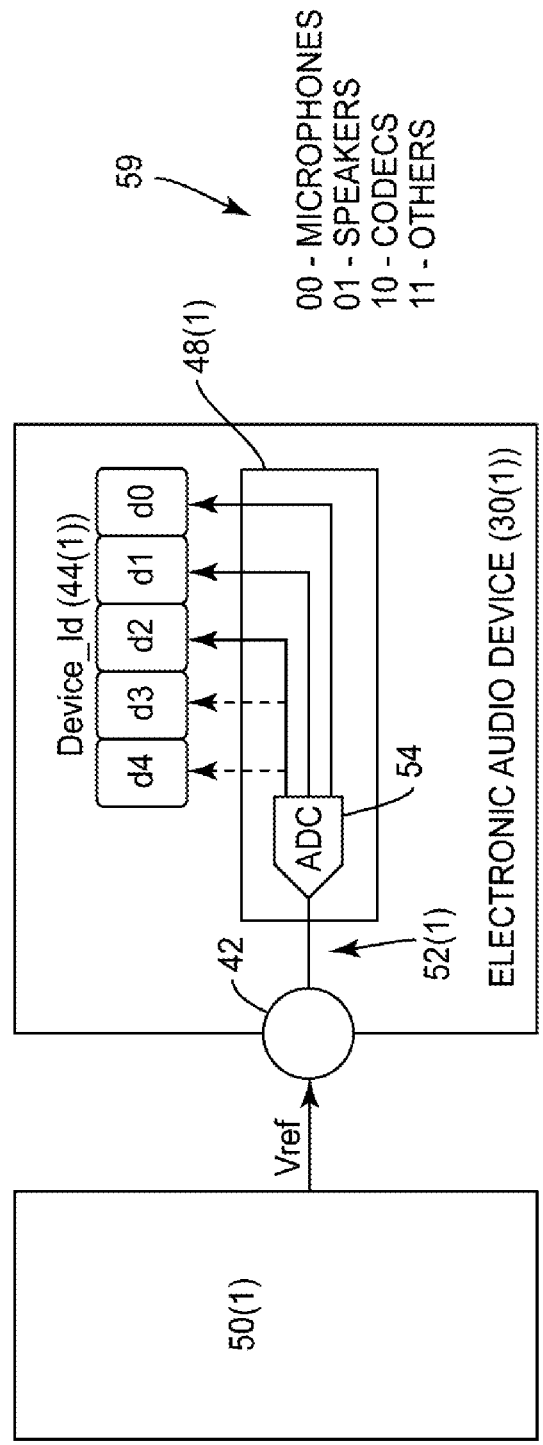
FIG. 4A is a schematic diagram of the electronic device of FIGS. 2A and 2B with a device identification generation circuit configured to generate a device identification based on a voltage level of an external, variable voltage source applied to an external pin of the electronic device, and program the generated device identification in the electronic device.

In this regard, FIG. 4A illustrates another exemplary electronic device 30(1). The electronic device 30(1) is similar to the electronic device 30 in FIGS. 2A-3 with common elements labeled with common numbers between FIGS. 2A-3 and FIG. 4A. The electronic device 30(1) in FIG. 4A includes a device identification generation circuit 48(1) to allow a Device_Id 44(1) of the electronic device 30(1) to be reprogrammed. The device identification generation circuit 48(1) is configured to generate a new Device_Id 44(1) based on a variable voltage Vref applied by an external source, which is an external variable voltage source 50(1) in this example, to the existing conference pin 42 of the electronic device 30(1). A circuit 52(1) is formed by the external source 50(1) that allows the variable voltage Vref to be detected by the device identification generation circuit 48(1) in the electronic device 30(1).

As illustrated in FIG. 4A, the Device_Id 44(1) in the electronic device 30(1) in this example is a multi-bit device identification memory comprised of five (5) binary bits in length as bits d4-d0. Thus, the electronic device 30(1) can be programmed with thirty-two (32) different device identifications as the Device_Id 44(1) (i.e., $2^5=32$). The device identification generation circuit 48(1) includes an analog-to-digital converter (ADC) 54 that is configured to generate a digital value based on the amplitude (i.e., voltage level) of the variable voltage Vref. The variable voltage Vref is divided into different voltage ranges by the ADC 54. In this manner, the external source 50(1) can externally program or reprogram the Device_Id 44(1) of the electronic device 30(1) to the desired device identification based on controlling the voltage level of the variable voltage Vref.

Thus, by using the external source 50(1), entities other than the manufacturer of the electronic device 30(1), such as an aggregator, for example, can control the external source 50(1) to cause the device identification generation circuit 48(1) within the electronic device 30(1) to program or reprogram the Device_Id 44(1). In this manner, uniqueness of the Device_Id 44(1) of the electronic device 30(1) can be controlled when employed in a system employing a common communications bus that identifies the slave devices to avoid bus communications collisions.

Note that circuits other than the ADC 54 may be provided in the electronic device 30(1) in FIG. 4A to generate the Device_Id 44(1) based on the voltage level of the variable voltage Vref. Non-limiting examples include an operational amplifier, an internal resistor, and an internal capacitor.

With continuing reference to FIG. 4A, the device identification generation circuit 48(1) can be configured to reprogram all or a subset of the bits d4-d0 of the Device_Id 44(1). For example, the ADC 54 in the device identification generation circuit 48(1) in the electronic device 30(1) is shown as being coupled to bits d2-d0, as one example in FIG. 4A. Thus, the device identification generation circuit 48(1) in this scenario is configured to reprogram less than all of the bits d4-d0 of the Device_Id 44(1). This may be advantageous, because it is not required to be able to reprogram all of the bits of the Device_Id 44(1) to provide a unique device identification for the electronic device 30(1). For example, a standard could be followed, wherein bits d4 and d3 are prefix values that can only be programmed with default values by the manufacturer of the electronic device 30(1) to identify the type of electronic device 30(1). For example, as shown in table 59, if bits d4 and d3 were programmed with '00', this could be deemed to mean that the electronic device 30(1) is a microphone. If bits d4 and d3 were programmed with '01', as shown in table 59, this could be deemed to mean that the electronic device 30(1) is a speaker. If bits d4 and d3 were programmed with '10', as shown in table 59, this could be deemed to mean that the electronic device 30(1) is a codec. If bits d4 and d3 were programmed with '11', as shown in table 59, this could be deemed to mean that the electronic device 30(1) is another audio device. This may save costs in that the ADC 54 in this example can be a lower cost device capable of converting fewer analog values to digital values.

Figure 4B:
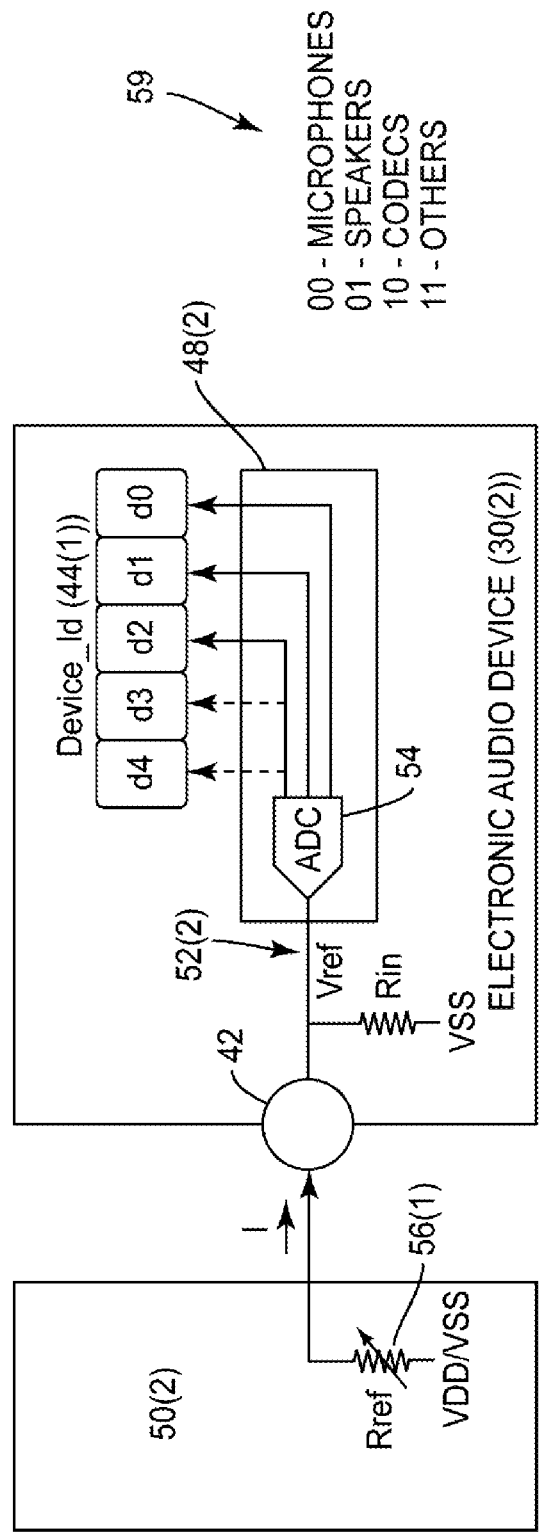
FIG. 4B is a schematic diagram of an alternative electronic device with a device identification generation circuit configured to generate a new device identification based on a resistance of an external, variable resistor applied to an external pin of the electronic device, and program the new generated device identification in the electronic device.

FIG. 4B is a schematic diagram of another example of an electronic device 30(2) with a device identification generation circuit 48(2) configured to generate a new Device_Id 44(1) based on a variable resistance Rref of an external, variable resistor 56(1) applied to the external conference pin 42 of the electronic device 30(2). The electronic device 30(2) is similar to the electronic devices 30, 30(1) in FIGS. 2A-4A with common elements labeled with common numbers between FIGS. 2A-4A and FIG. 4B. In this example, instead of the external source 50(1) in FIG. 4A applying the variable voltage Vref to the device identification generation circuit 48(1) of the electronic device 30(1), an alternative external source 50(2) is provided in FIG. 4B that is configured to apply the variable resistance Rref of the external, variable resistor 56(1) to the conference pin 42. The external source 50(2) is configured to apply either a positive power rail (Vdd) or ground (Vss) to the external, variable resistor 56(1). The variable resistance Rref of the external, variable resistor 56(1) will form a circuit 52(2) providing a voltage divider dividing the voltage across the external, variable resistor 56(1) and an internal resistor Rin in the electronic device 30(2) to generate the variable voltage Vref. Similar to the electronic device 30(1) in FIG. 4A, the ADC 54 of the device identification generation circuit 48(2) is configured to generate a digital value based on the amplitude (i.e., voltage level) of the variable voltage Vref. The variable voltage Vref is divided into different voltage ranges by the ADC 54. In this manner, the external source 50(2) can externally program or reprogram the Device_Id 44(1) of the electronic device 30(2) to the desired device identification based on controlling the voltage level of the variable voltage Vref.

Figure 4C:
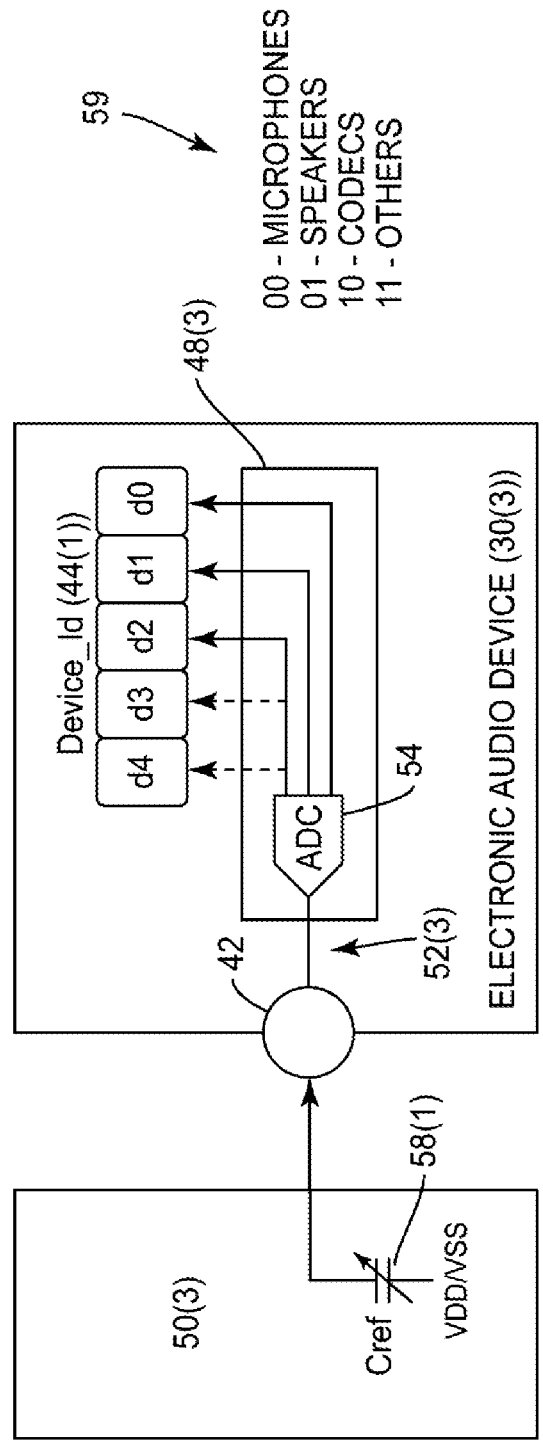
FIG. 4C is a schematic diagram of an alternative electronic device with a device identification generation circuit configured to generate a new device identification based on a capacitance of an external, variable capacitor applied to an external pin of the electronic device, and program the new generated device identification in the electronic device.

FIG. 4C is a schematic diagram of another example of an electronic device 30(3) with a device identification generation circuit 48(3) configured to generate a new Device_Id 44(1) based on a capacitance Cref of an external, variable capacitor 58(1) applied to the conference pin 42 of the electronic device 30(3). The electronic device 30(3) is similar to the electronic devices 30, 30(1) in FIGS. 2A-4A with common elements labeled with common numbers between FIGS. 2A-4A and FIG. 4C. In this example, instead of the external source 50(2) in FIG. 4B applying the variable voltage Vref to the device identification generation circuit 48(2) of the electronic device 30(2), an alternative external source 50(3) is provided in FIG. 4C that is configured to apply the variable capacitance Cref of the external, variable capacitor 58(1) to the conference pin 42. The external source 50(3) is configured to apply either the power rail (Vdd) or ground (Vss) to the external, variable capacitor 58(1). The variable capacitance Cref of the external, variable capacitor 58(1) will form a circuit 52(3) coupling the variable capacitance Cref of the external, variable capacitor 58(1) to the device identification generation circuit 48(3). The device identification generation circuit 48(3) is configured to detect the variable capacitance Cref by measuring the charge time of the external, variable capacitor 58(1). The detected variable capacitance Cref can be used by the ADC 54 of the device identification generation circuit 48(3) to generate a digital value based on the variable capacitance Cref of the external, variable capacitor 58(1).

Note that in other examples of the electronic device 30(1)-30(3) in FIGS. 4A-4C, the electronic device 30 could be provided with an alternative device identification generation circuit 48 that is configured to generate the new Device_Id 44 based on another electrical characteristic other than resistance, inductance, or capacitance. For example, the electrical characteristic may be a frequency of an external signal applied by an external source 50 to a device identification generation circuit 48 of the electronic device 30. For example, the external signal may be a communications bus signal, including a data signal or clock signal, as discussed below. The device identification generation circuit 48 could be configured to measure the frequency of the external signal to be used by an ADC 54 to generate a digital value based on such frequency.

Figure 4D:
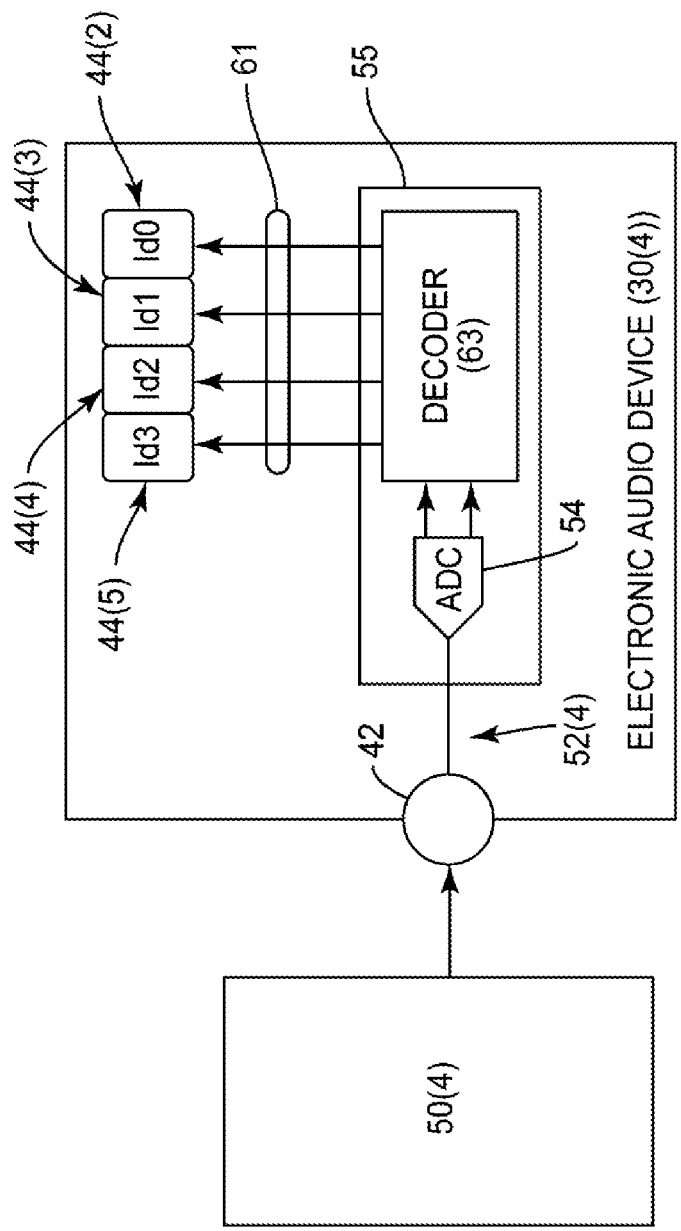
FIG. 4D is a schematic diagram of an alternative electronic device with a device identification selection circuit configured to select a device identification to be used to identify the electronic device based on an electrical characteristic applied to an external pin of the electronic device.

It may also be desired to allow an electronic device to select predefined device identifiers programmed into the electronic device beforehand, such as by a manufacturer, as the device identification for the electronic device. This feature could be provided in lieu or in addition to an electronic device being configured to allow its device identification to be reprogrammed, as provided in the electronic devices 30-30(3) described above. In this regard, FIG. 4D is a schematic diagram of an alternative electronic device 30(4) configured to select a device identification to be used to identify the electronic device 30(4) based on an electrical characteristic applied to the conference pin 42 as a device identification pin provided as a device identification port. The manner in which an external source 50(4) in FIG. 4D can generate an electrical characteristic that can be detected in a circuit 52(4) can be the same as provided in any of the examples described above and therein, and thus will not be re-described.

However, in the electronic device 30(4) in FIG. 4D, a device identification selection circuit 55 is provided as an alternative to a device identification generation circuit. The device identification selection circuit 55 includes an ADC 54 similar to the device identification generation circuits 48-48 (3) described above. The electrical characteristic generated by the external source 50(4) on the conference pin 42 can be detected by the device identification selection circuit 55. The ADC 54 of the device identification selection circuit 55 is configured to generate a digital value based on the electrical characteristic detected by the device identification selection circuit 55. The ADC 54 may be a low cost ADC. A decoder 63 is provided in the device identification selection circuit 55 that is configured to receive and use the generated digital value by the ADC 54 to select one of a plurality of decoder lines 61 to select one of a plurality of device identifiers Id3-Id0, which each have pre-stored Device_Ids 44(2)-44 (5). In one aspect, each of the Device_Ids 44(2)-44(5) is unique relative to the others. Each of the device identifiers Id3-Id0 may be comprised of any number of bits desired.

The selected device identifier Id3-Id0 can be used as the device identification for the electronic device 30(4). In this example, since there are four (4) Device_Ids 44(2)-44(5), the decoder 63 is a 2-4 decoder, wherein the decoder 63 is configured to receive a two (2) bit digital value from the ADC 54.

Thus in summary, in the electronic device 30(4) of FIG. 4D, while the device identification is not reprogrammable in this example, by providing the plurality of Device_Ids 44(2)-44(5) that are selectable, the device identification to be used by the electronic device 30(4) to identify itself can be chosen through the external source 50(4). An external source applied to an electronic device, such as the electronic devices 30-30(4) described above, to cause a device identification therein to be reprogrammed or selected can also be provided by another electronic device that is coupled to a common communications bus with the electronic device to be reprogrammed.

Figure 5:
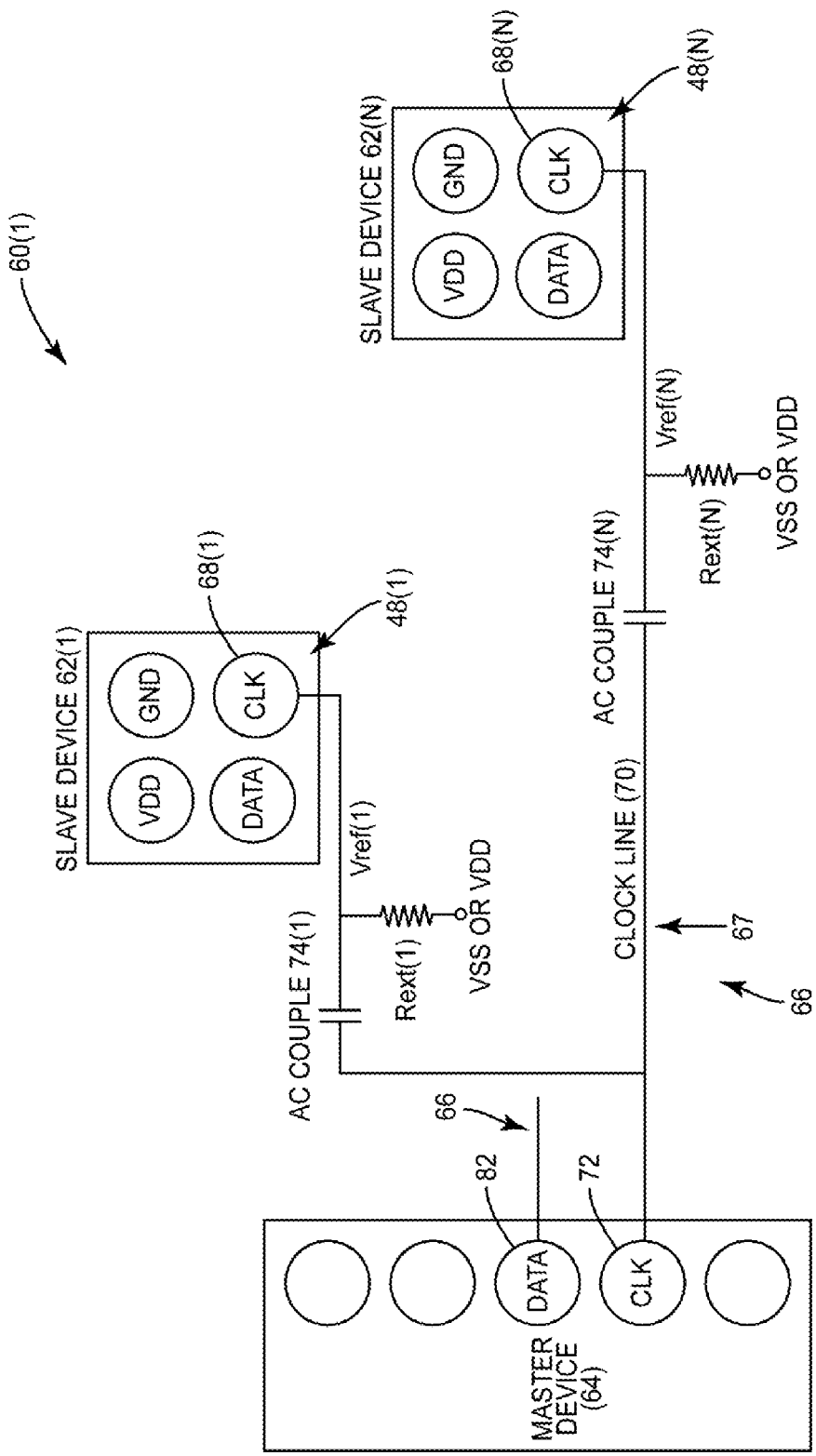
FIG. 5 is a schematic diagram of an exemplary bus communications system that includes exemplary slave devices, each having a device identification generation circuit configured to generate a new device identification based on a voltage applied to existing CLOCK pins as a result of pull-up or pull-down resistors coupled to a common clock line of a communications bus, and program the new generated device identification in the slave device.

In this regard, FIG. 5 is a schematic diagram of an exemplary bus communications system 60(1). The bus communications system 60(1) includes exemplary slave devices 62(1)-62(N) and a master device 64 coupled to a communications bus 66, wherein 'N' signifies the number of slave devices 62. The master device 64 and/or the slave devices 62(1)-62(N) may be provided in separate components or located on the same electronics board, as non-limiting examples. While the bus communications system 60(1) in FIG. 5 is an exemplary system, the bus communications system 60(1) may also be any other system that includes a communications bus that calls for device identification of slave devices coupled to the communications bus as part of the protocol of the system. Each of the slave devices 62(1)-62(N) has a device identification generation circuit 48(1)-48(N) that can be like the device identification generation circuits described above.

With continuing reference to FIG. 5, the device identification generation circuits 48(1)-48(N) are configured to generate a new Device_Id (not shown) for their respective slave devices 62(1)-62(N) based on variable voltages Vref(1)-Vref(N) applied to a communications bus signal 65. In this example, the communications bus signal 65 used to generate a new Device_Id for the slave device 62(1)-62(N) is a communications bus clock signal 67. The communications bus clock signal 67 is asserted on existing clock pins 68(1)-68(N) of the respective slave devices 62(1)-62(N) as a result of external pull-up or pull-down resistors Rext(1)-Rext(N) coupled to a common clock line 70 of the communications bus 66. The variable voltages Vref(1)-Vref(N) are generated as a result of a constant toggling rate of the communications bus clock signal 67 applied to the clock line 70, which is coupled to the clock pins 68(1)-68(N) and a master clock port provided as master clock pin 72. Alternating current (AC) couples 74(1)-74(N) are provided and coupled on the clock line 70 to filter the AC component of the communications bus clock signal 67, so that the direct current (DC) component of the communications bus clock signal 67 is applied to the external resistors Rext(1)-Rext(N) to generate the unique variable voltages Vref(1)-Vref(N). In this regard, the external resistors Rext(1)-Rext(N) can be chosen to have unique resistance values that cause the variable voltages Vref(1)-Vref(N) to cause the ADCs within the device identification generation circuits 48(1)-48(N) to generate different digital output values to generate unique device identifications (e.g., Device_Ids). Alternatively, as another example, variable voltages Vref(1)-Vref(N) could be generated as a result of toggling a control signal (not shown) as part of the communications bus 66 applied to the external resistors Rext(1)-Rext(N).

It may be desired to allow the slave devices 62(1)-62(N) in the bus communications system 60(1) in FIG. 5 to program or reprogram their respective device identifications while the communications bus 66 is actively routing bus communications data from a master data pin 82 of the master device 64. In this manner, the slave devices 62(1)-62(N) that are not programming or reprogramming their device identification can continue to operate. For example, slave device 62(N) may be added to the communications bus 66 after slave device 62(1) is already coupled to the communications bus 66 and actively receiving and exchanging communications data with the master device 64 over the communications bus 66.

Figure 6:
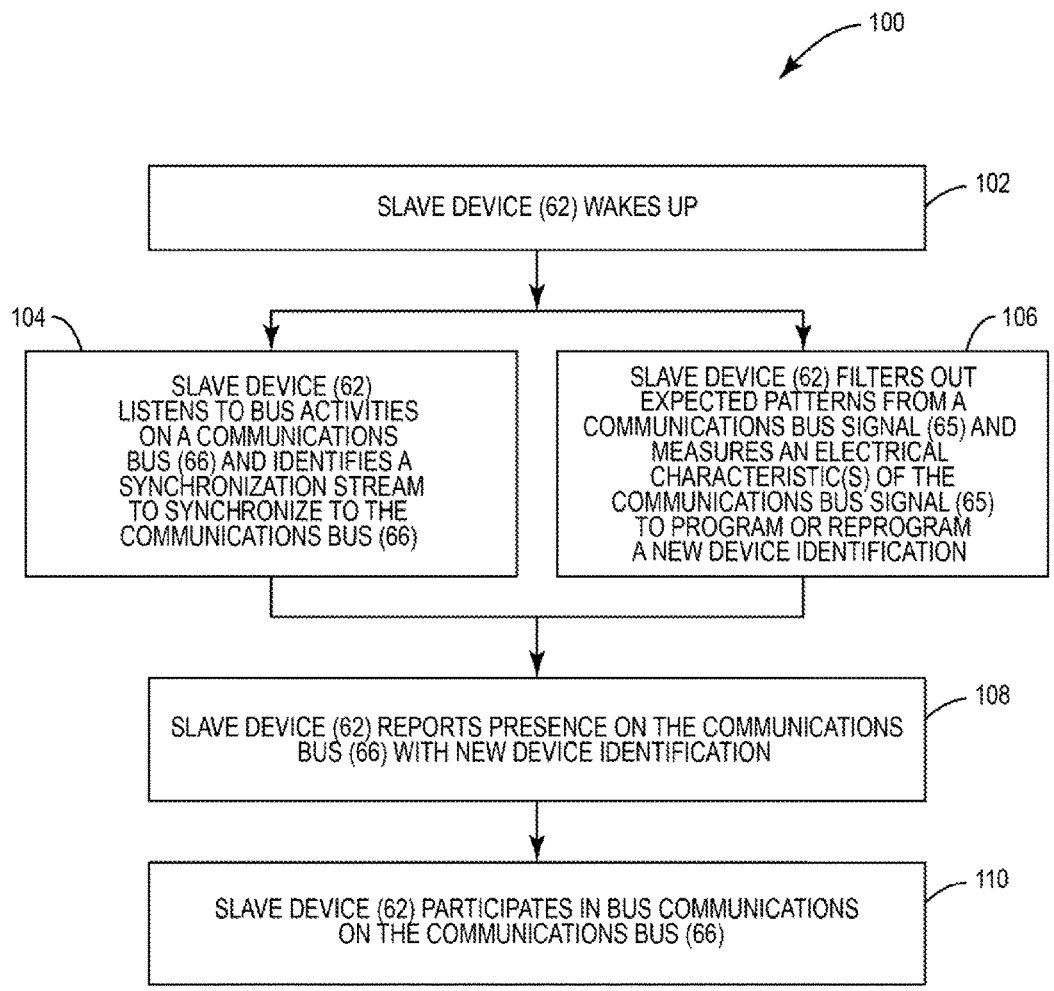
FIG. 6 is a flowchart of an exemplary process of a slave device coupled to the communications bus in FIG. 5 generating a new device identification while the communications bus is active.

In this regard, FIG. 6 is a flowchart of an exemplary process 100 of the slave device 62 coupled to the communications bus 66 in FIG. 5 generating a new device identification while the communications bus 66 is active in an ordered sequence. With reference to FIG. 6, the slave device 62 wakes up after being coupled to the communications bus 66 (block 102). For example, a slave device 62 may wake up after being powered on. The slave device 62 then listens to bus activities on the communications bus 66 and identifies a synchronization stream to synchronize to the communications bus 66 (block 104). For example, the slave device 62 may listen to slave device status reports on the communications bus 66. Also, the slave device 62 filters out expected patterns from the communications bus signal 65 and measures an electrical characteristic(s) of the communications bus signal 65 to program or reprogram its device identification (Device_Id), as previously described (block 106). For example, in the bus communications system 60(1) in FIG. 5, the communications bus signal 65 is the communications bus clock signal 67. Thus, the slave device 62 measures an electrical characteristic(s) of the communications bus clock signal 67 in the example of FIG. 5 to program its device identification (Device_Id).

With continuing reference to FIG. 6, the slave device 62 may be configured to filter out expected patterns from the communications bus signal 65 and measure an electrical characteristic(s) of the communications bus signal 65 in block 106 while the slave device 62 listens to the bus activities on the communications bus 66 in block 104 in parallel operations to reduce bus communications readiness time. In this manner, when the slave device 62 is ready to communicate on the communications bus 66, the slave device 62 can report its presence on the communications bus 66 with its new device identification (Device_Id) (block 108). The slave device 62 then participates in bus communications on the communications bus 66 using its new programmed device identification (block 110).

Figure 7:
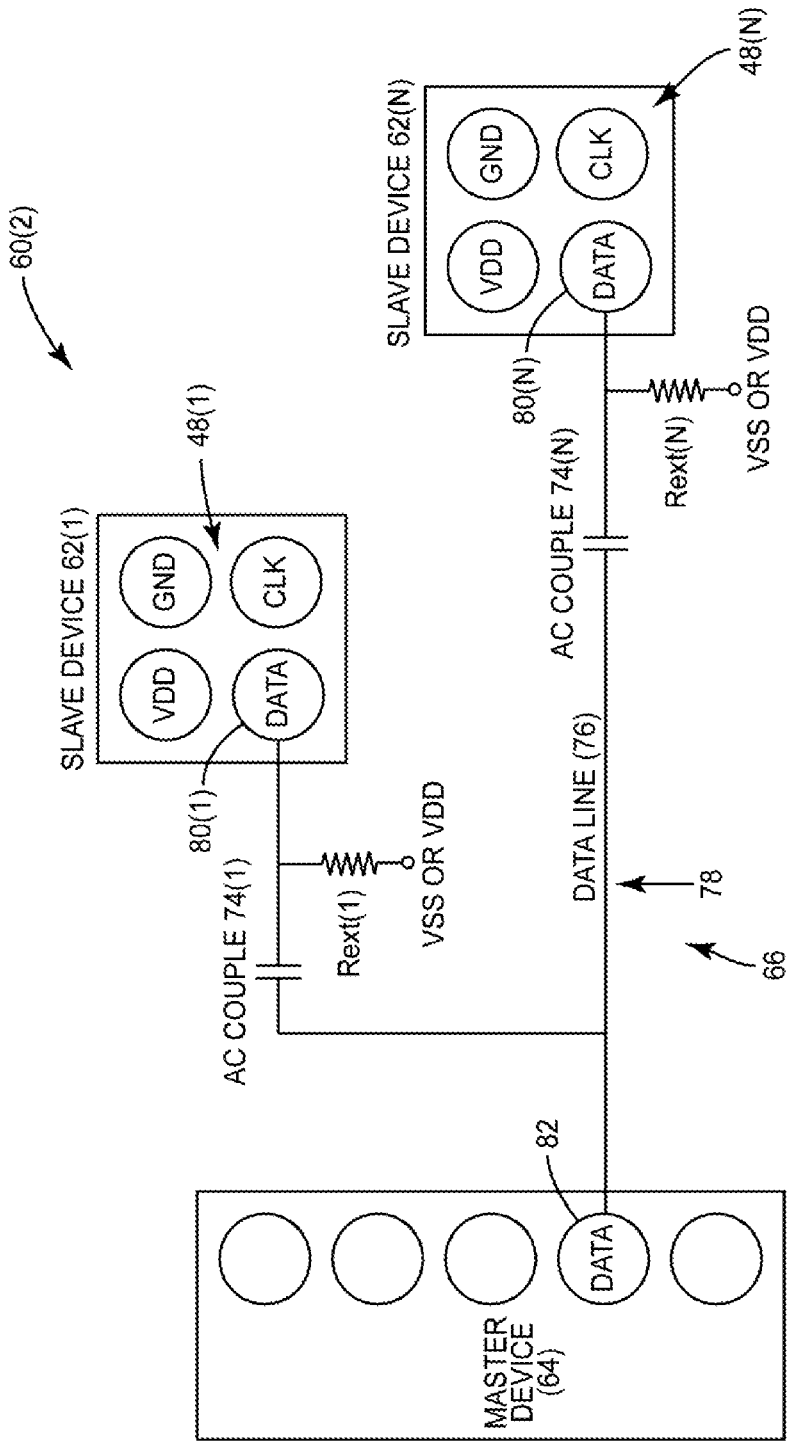
FIG. 7 is a schematic diagram of another exemplary bus communications system that includes exemplary slave devices each having a device identification generation circuit configured to generate a new device identification based on a voltage applied to existing DATA pins as a result of a pull-up or pull-down resistors coupled to a common data line of a communications bus, and program the new generated device identification in the device.

It may also be desired to allow a slave device 62 to program or reprogram its device identification by measuring an electrical characteristic(s) of a data signal as the communications bus signal 65. In this regard, FIG. 7 is a schematic diagram of another exemplary bus communications system 60(2) that includes the slave devices 62(1)-62(N) and the master device 64 coupled to the communications bus 66, as provided in FIG. 5. 'N' signifies the number of slave devices 62. However, the bus communications system 60(2) in FIG. 7 may also be any other system that includes a communications bus that calls for device identification of slave devices coupled to the communications bus as part of the protocol of the system. The device identification generation circuits 48(1)-48(N) are configured to generate a new Device_Id for their respective slave device 62(1)-62(N) based on variable voltages Vref(1)-Vref(N) as applied to existing data pins 80(1)-80(N), respectively, as a result of the external pull-up or pull-down resistors Rext(1)-Rext(N) coupled to a common data line 76 of the communications bus 66. The variable voltages Vref(1)-Vref(N) are generated as a result of a toggling of a communications bus data signal 78 applied to the data line 76, which is coupled to the data pins 80(1)-80(N) and a master data port provided as the master data pin 82. Just as provided in the bus communications system 60(1) in FIG. 5, the AC couples 74(1)-74(N) are provided and coupled on the data line 76 to filter any AC component of the communications bus data signal 78, so that the DC component of the communications bus data signal 78 is applied to the external resistors Rext(1)-Rext(N) to generate the unique variable voltages Vref(1)-Vref(N). In this regard, the external resistors Rext(1)-Rext(N) can be chosen to have unique resistance values that cause the variable voltages Vref(1)-Vref(N) to cause the ADCs within the device identification generation circuits 48(1)-48(N) to generate different digital output values to generate unique Device_Ids.

The process in FIG. 6 of the slave device 62 coupled to the communications bus 66 to generate a new device identification while the communications bus 66 is active, can also be employed by the slave devices 62(1)-62(N) in the bus communications system 60(2) in FIG. 7.

Figure 8A:
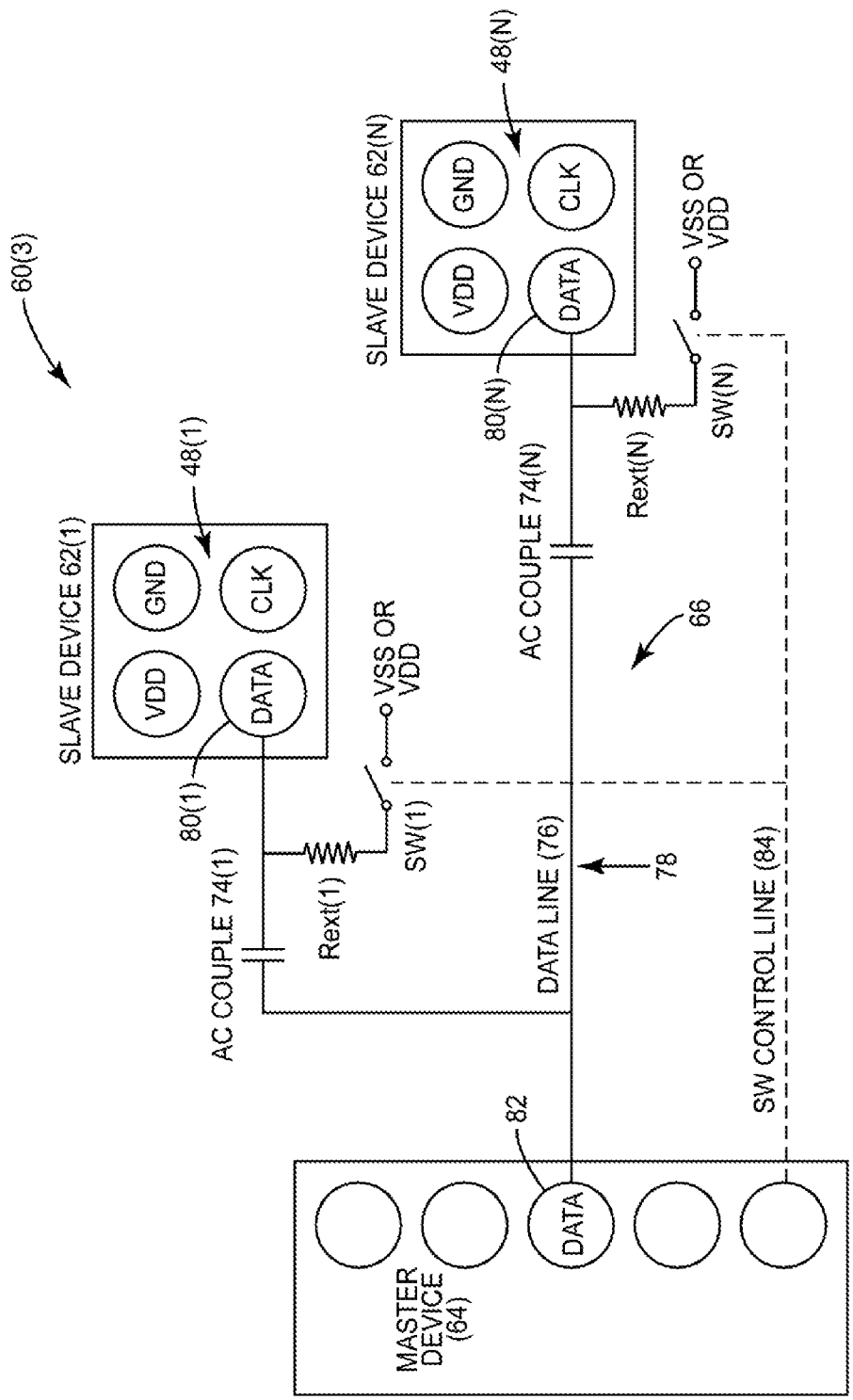
FIG. 8A is a schematic diagram of another exemplary bus communications system in FIG. 7, but with switches provided to switchably couple a power rail to pull-up or pull-down resistors coupled to the common data line of the communications bus during device identification by a master device, and to decouple the power rail to the pull-up or pull-down resistors coupled to the common data line of the communications bus after device identification to reduce power consumption.

FIG. 8A is a schematic diagram of another exemplary bus communications system 60(3) similar to the bus communications system 60(2) in FIG. 7. In the bus communications system 60(3) in FIG. 8A, switches SW(1)-SW(N) are provided and disposed between the respective external resistors Rext(1)-Rext(N) and Vdd or Vss to switchably couple either the Vdd or Vss power rail to the external resistors Rext(1)-Rext(N). The switches SW(1)-SW(N) can be controlled by a switch control line 84 coupled to the master device 64 to be closed to couple the external resistors Rext(1)-Rext(N) to Vdd or Vss, when it is desired by the master device 64 to reprogram the Device_Ids of the slave devices 62(1)-62(N). Likewise, the switches SW(1)-SW(N) can be controlled by the switch control line 84 coupled to the master device 64 to be open to decouple the external resistors Rext(1)-Rext(N) to Vdd or Vss, after the master device 64 has reprogrammed the Device_Ids of the slave devices 62(1)-62(N). In this manner, when the Device_Ids of the slave devices 62(1)-62(N) are not being programmed, the external resistors Rext(1)-Rext(N) are decoupled from Vdd or Vss so that power is not dissipated by the external resistors Rext(1)-Rext(N), thereby conserving power.

The process in FIG. 6 of the slave device 62 coupled to the communications bus 66 to generate a new device identification while the communications bus 66 is active, can also be employed by the slave devices 62(1)-62(N) in the bus communications system 60(3) in FIG. 8A.

Figure 8B:
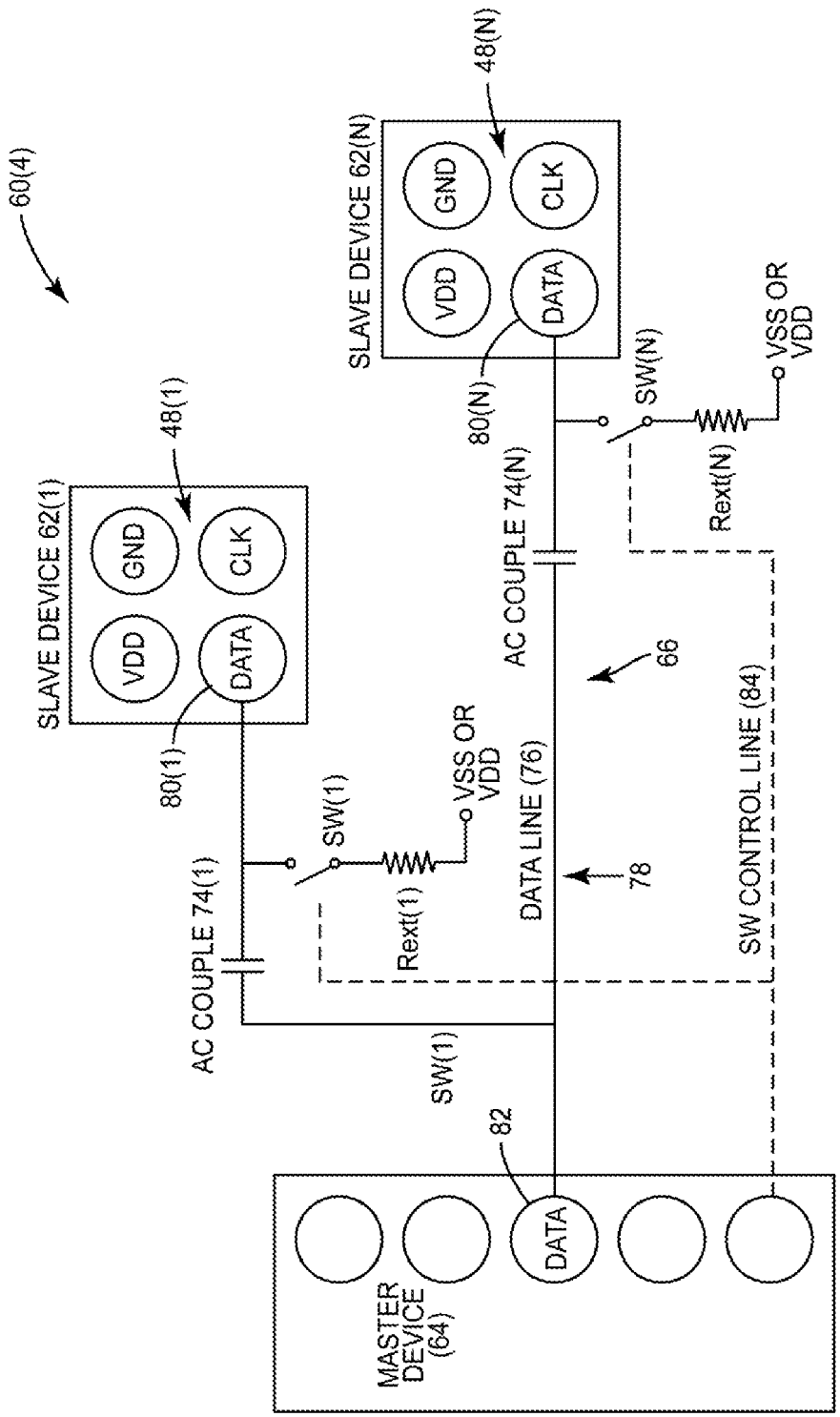
FIG. 8B is a schematic diagram of another exemplary bus communications system in FIG. 7, but with switches provided to switchably couple the pull-up or pull-down resistors to the common data line of the communications bus during device identification by a master device, and to decouple the pull-up or pull-down resistors to the common data line of the communications bus after device identification to reduce power consumption.

FIG. 8B is a schematic diagram of another exemplary bus communications system 60(4) similar to the bus communications system 60(3) in FIG. 8A. However, the switches SW(1)-SW(N) are provided and disposed between the data pins 80(1)-80(N) and the respective external resistors Rext(1)-Rext(N) to switchably couple either the Vdd or Vss power rail to the external resistors Rext(1)-Rext(N). The switches SW(1)-SW(N) can be controlled by the switch control line 84 coupled to the master device 64 to be closed to couple the data pins 80(1)-80(N) to the respective external resistors Rext(1)-Rext(N), when it is desired by the master device 64 to reprogram the Device_Ids of the slave devices 62(1)-62(N), such as during an initialization process or slave device 62 discovery process. Likewise, the switches SW(1)-SW(N) can be controlled by the switch control line 84 coupled to the master device 64 to be open to decouple the data pins 80(1)-80(N) from the respective external resistors Rext(1)-Rext(N), after the master device 64 has reprogrammed the Device_Ids of the slave devices 62(1)-62(N). In this manner, when the Device_Ids of the slave devices 62(1)-62(N) are not being programmed, the external resistors Rext(1)-Rext(N) are decoupled from Vdd or Vss so that power is not dissipated by the external resistors Rext(1)-Rext(N), thereby conserving power.

The process in FIG. 6 of the slave device 62 coupled to the communications bus 66 to generate a new device identification while the communications bus 66 is active, can also be employed by the slave devices 62(1)-62(N) in the bus communications system 60(4) in FIG. 8B.

Examples of providing device identification generation in electronic devices to allow external control, such as selection or reprogramming, of device identification for bus communications identification can be provided in different communications systems employing differing types of communications buses. Other communications systems may also require electronic devices communicatively coupled to the communications bus to have unique device identifications.

In this regard, the MIPI® Alliance has recently announced SoundWire™ as a communications protocol for transporting digital data relating to audio channels to different audio devices within an electronic device. As used herein, the SoundWire™ specification is intended to mean at least the SOUNDWIRE specification version 8, revision 04, published 29 Oct. 2014, which is herein incorporated by reference in its entirety. In Soundwire™, one SoundWire™ master interface allows a master electronic device ("master device"), or monitor communicatively coupled thereto, to communicate over a common communications bus with one or more slave electronic devices ("slave devices") coupled to SoundWire™ slave interfaces. The master device communicates with the slave devices using two (2) physical signals: a clock signal communicated over a common clock wire, and a data signal communicated over a common data wire of a Soundwire™ communications bus. Thus, in a Soundwire™ system, a time division multiplexed (TDM) frame structure is used for transport of bitrate media streams over the common Soundwire™ communications bus to avoid data collisions. The master device allocates a transmission time slot to each of the slave devices for bus communications. Thus, the Soundwire™ protocol may require that each of the slave devices connected to the Soundwire™ communications bus be identified by the master device through a unique device identification.

Figure 9:
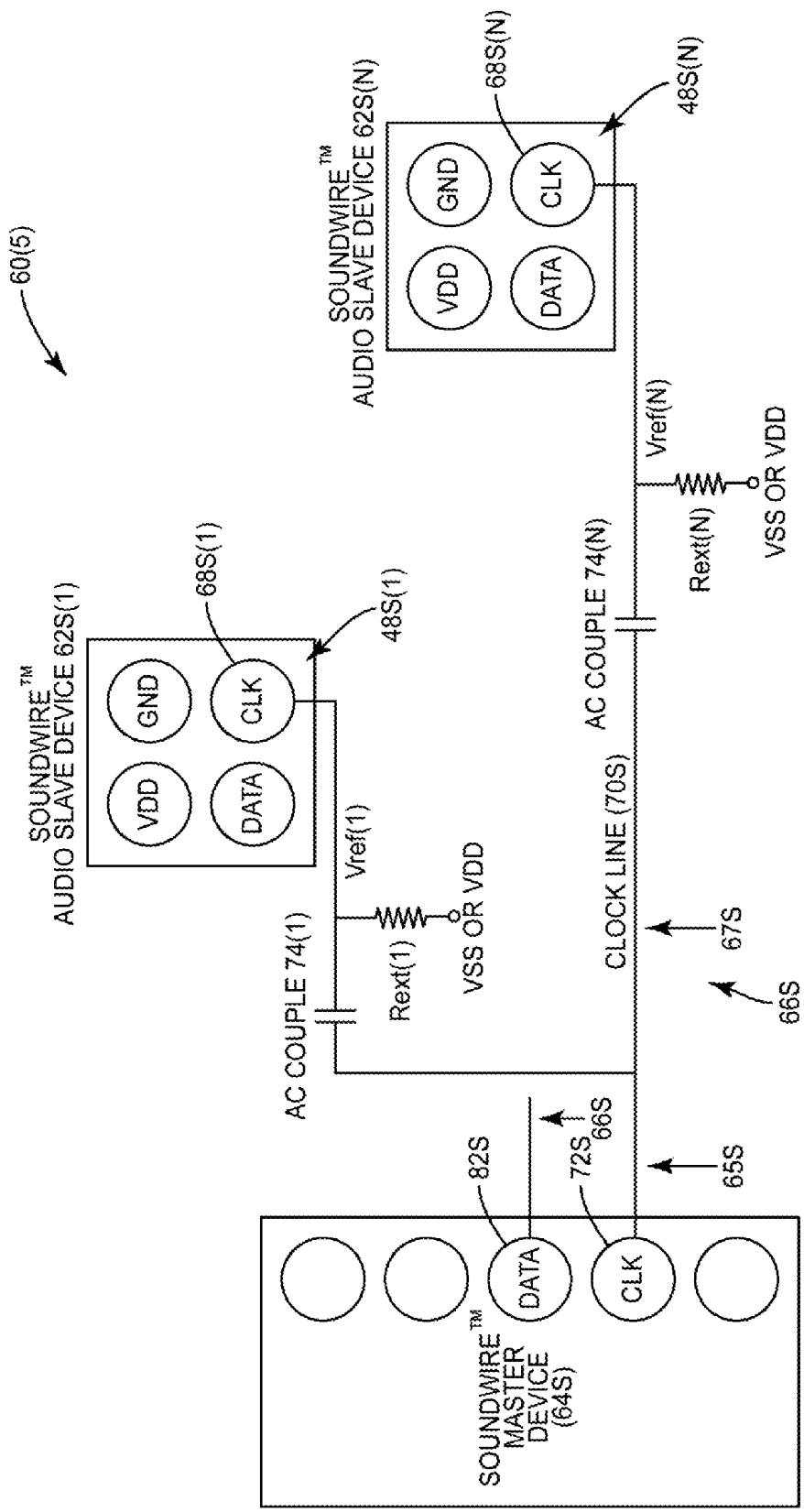
FIG. 9 is a schematic diagram of an exemplary Soundwire™ bus communications system that includes exemplary Soundwire™ audio slave devices, each having a device identification generation circuit configured to generate a new device identification based on a voltage applied to existing CLOCK pins as a result of pull-up or pull-down resistors coupled to a common clock line of a Soundwire™ communications bus, and program the new generated device identification in the Soundwire™ audio slave device.

In this regard, FIG. 9 is a schematic diagram of an exemplary Soundwire™ bus communications system 60(5). The Soundwire™ bus communications system 60(5) includes exemplary Soundwire™ audio slave devices 62S(1)-62S(N) and a Soundwire™ master device 64S coupled to a Soundwire™ communications bus 66S, wherein 'N' signifies the number of Soundwire™ audio slave devices 62S(1)-62S(N). The Soundwire™ master device 64S and/or the Soundwire™ audio slave devices 62S(1)-62S(N) may be provided in separate components or located on the same electronics board, as non-limiting examples. Each of the Soundwire™ audio slave devices 62S(1)-62S(N) has a device identification generation circuit 48S(1)-48S(N) that can be like the device identification generation circuits 48(1)-48(N) described above in FIG. 5.

With continuing reference to FIG. 9, the device identification generation circuits 48S(1)-48S(N) are configured to generate a new Device_Id (not shown) for their respective Soundwire™ audio slave devices 62S(1)-62S(N) based on variable voltages Vref(1)-Vref(N) applied to a Soundwire™ communications bus signal 65S. In this example, the Soundwire™ communications bus signal 65S used to generate a new Device_Id for the Soundwire™ audio slave devices 62S(1)-62S(N) is a communications bus clock signal 67S. The communications bus clock signal 67S is asserted on existing clock pins 68S(1)-68S(N) of the respective Soundwire™ audio slave devices 62S(1)-62S(N) as a result of external pull-up or pull-down resistors Rext(1)-Rext(N) coupled to a common clock line 70S of the Soundwire™ communications bus 66S. The variable voltages Vref(1)-Vref(N) are generated as a result of a constant toggling rate of the communications bus clock signal 67S applied to the clock line 70S, which is coupled to the clock pins 68S(1)-68S(N) and a master clock port provided as master clock pin 72S. AC couples 74(1)-74(N) are provided and coupled on the clock line 70S to filter the AC component of the communications bus clock signal 67S, so that the DC component of the communications bus clock signal 67S is applied to the external resistors Rext(1)-Rext(N) to generate the unique variable voltages Vref(1)-Vref(N). In this regard, the external resistors Rext(1)-Rext(N) can be chosen to have unique resistance values that cause the variable voltages Vref(1)-Vref(N) to cause the ADCs within the device identification generation circuits 48S(1)-48S(N) to generate different digital output values to generate unique device identifications (e.g., Device_Ids). Alternatively, as another example, variable voltages Vref(1)-Vref(N) could be generated as a result of toggling a control signal (not shown) as part of the Soundwire™ communications bus 66S applied to the external resistors Rext(1)-Rext(N).

It may be desired to allow the Soundwire™ audio slave devices 62S(1)-62S(N) in the Soundwire™ bus communications system 60(5) in FIG. 9 to program or reprogram their respective device identifications while the Soundwire™ communications bus 66S is actively routing bus communications data from a master data pin 82S of the Soundwire™ master device 64S. In this manner, the Soundwire™ audio slave devices 62S(1)-62S(N) that are not programming or reprogramming their device identification can continue to operate. For example, Soundwire™ audio slave device 62S(N) may be added to the Soundwire™ communications bus 66S after Soundwire™ audio slave device 62S(1) is already coupled to the Soundwire™ communications bus 66S and actively receiving and exchanging Soundwire™ communications data with the Soundwire™ master device 64S over the Soundwire™ communications bus 66S.

Figure 10:
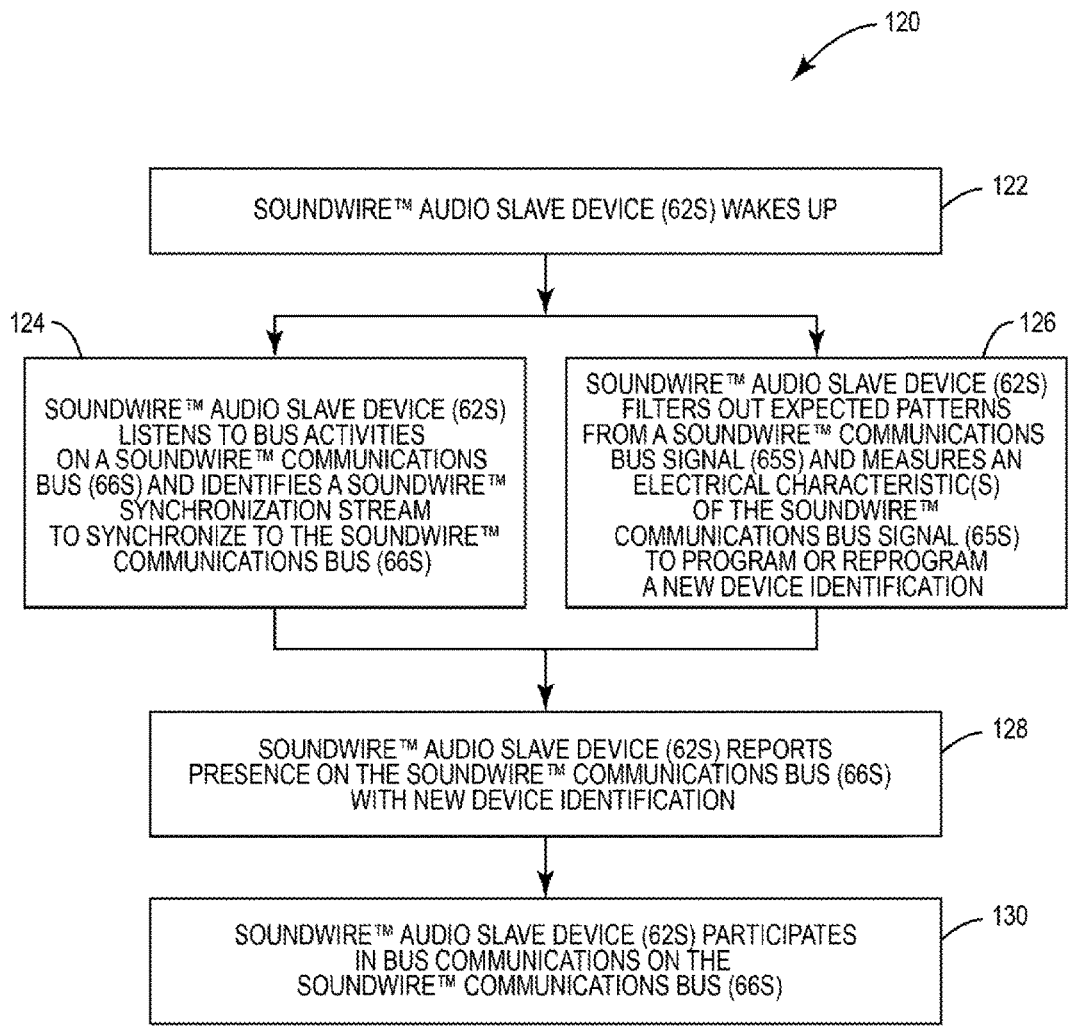
FIG. 10 is a flowchart of an exemplary process of a Soundwire™ audio slave device coupled to the Soundwire™ communications bus in FIG. 9 generating a new device identification while the Soundwire™ communications bus is active.

In this regard, FIG. 10 is a flowchart of an exemplary process 120 of the Soundwire™ audio slave device 62S coupled to the Soundwire™ communications bus 66S in FIG. 9 generating a new device identification while the Soundwire™ communications bus 66S is active in an ordered sequence. With reference to FIG. 10, the Soundwire™ audio slave device 62S wakes up after being coupled to the Soundwire™ communications bus 66S (block 122). For example, a Soundwire™ audio slave device 62S may wake up after being powered on. The Soundwire™ audio slave device 62S then listens to bus activities on the Soundwire™ communications bus 66S and identifies a Soundwire™ synchronization stream to synchronize to the Soundwire™ communications bus 66S (block 124). For example, the Soundwire™ audio slave device 62S may listen to Soundwire™ audio slave device status reports on the Soundwire™ communications bus 66S. Also, the Soundwire™ audio slave device 62S filters out expected patterns from the Soundwire™ communications bus signal 65S and measures an electrical characteristic(s) of the Soundwire™ communications bus signal 65S to program or reprogram its device identification (Device_Id), as previously described (block 126). For example, in the Soundwire™ bus communications system 60(5) in FIG. 10, the Soundwire™ communications bus signal 65S is the communications bus clock signal 67S. Thus, the Soundwire™ audio slave device 62S measures an electrical characteristic(s) of the communications bus clock signal 67S in the example of FIG. 9 to program its device identification (Device_Id).

With continuing reference to FIG. 10, the Soundwire™ audio slave device 62S may be configured to filter out expected patterns from the Soundwire™ communications bus signal 65S and measure an electrical characteristic(s) of the Soundwire™ communications bus signal 65S in block 116 while the Soundwire™ audio slave device 62S listens to the bus activities on the Soundwire™ communications bus 66S in block 114 in parallel operations to reduce bus communications readiness time. In this manner, when the Soundwire™ audio slave device 62S is ready to communicate on the Soundwire™ communications bus 66S, the Soundwire™ audio slave device 62S can report its presence on the Soundwire™ communications bus 66S with its new device identification (Device_Id) (block 128). The Soundwire™ audio slave device 62S then participates in bus communications on the Soundwire™ communications bus 66S using its new programmed device identification (block 130).

Audio electronic devices that include device identification generation circuits disclosed herein to allow external control, such as selection or reprogramming, of device identification for bus communications identification may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A bus communications system for allowing a slave device coupled to a communications bus to reprogram its device identification, comprising:
the communications bus comprised of a data line and a clock line;
a master device comprised of a master data port and a master clock port, the master device coupled to the communications bus by the master data port coupled to the data line and the master clock port coupled to the clock line;
the slave device comprising:
a device identification port coupled to the communications bus, the device identification port comprising one of a data pin and a clock pin, the data pin coupled to the data line of the communications bus, and the clock pin coupled to the clock line of the communications bus; and
a device identification generation circuit coupled to the device identification port, the device identification generation circuit configured to:
detect an electrical characteristic of a communications bus signal received from the communications bus on the device identification port through the one of the data pin and the clock pin;
generate a device identification based on the detected electrical characteristic selected from a plurality of device identifications provided in the slave device; and
store the generated device identification in a device identification memory;
an alternative current (AC) couple coupled to the device identification port;
an external resistor coupled to the device identification port;
a switch configured to switchably couple the external resistor to the device identification port; and
a switch control line configured to control an opening or closing of the switch,
wherein the master device is configured to generate a control signal on the switch control line to cause the switch to open or close to control coupling of the external resistor to the device identification port.

2. The bus communications system of claim 1, wherein the device identification generation circuit is configured to detect the electrical characteristic of the communications bus signal comprised of a communications bus data signal received from the communications bus on the device identification port.

3. The bus communications system of claim 1, wherein the device identification generation circuit is configured to detect the electrical characteristic of the communications bus signal comprised of a voltage of the communications bus signal.

4. The bus communications system of claim 3, wherein the voltage of the communications bus signal is a variable voltage.

5. The bus communications system of claim 1, wherein the device identification generation circuit is configured to detect the electrical characteristic of the communications bus signal comprised of a resistance of the external resistor.

6. The bus communications system of claim 5, wherein the external resistor is a variable resistor.

7. The bus communications system of claim 1, wherein the device identification generation circuit is configured to detect the electrical characteristic of the communications bus signal comprised of a capacitance of the communications bus signal.

8. The bus communications system of claim 1, wherein the device identification generation circuit is configured to detect the electrical characteristic of the communications bus signal comprised of a capacitance of an external capacitor coupled to the device identification port.

9. The bus communications system of claim 8, wherein the external capacitor is a variable capacitor.

10. The bus communications system of claim 1, wherein the device identification generation circuit is configured to detect the electrical characteristic of the communications bus signal comprised of a frequency of the communications bus signal.

11. The bus communications system of claim 1, wherein the device identification generation circuit comprises a buffer circuit.

12. The bus communications system of claim 1, wherein the device identification generation circuit comprises an analog-to-digital converter (ADC) configured to convert an analog value of the detected electrical characteristic of the communications bus signal into a digital value as the device identification.

13. The bus communications system of claim 1, wherein the device identification memory is configured to store a multi-bit device identification.

14. The bus communications system of claim 13, wherein the device identification generation circuit is configured to store a subset of bits of the multi-bit device identification in the device identification memory.

15. The bus communications system of claim 1, wherein the device identification generation circuit is configured to detect the electrical characteristic of the communications bus signal received from the communications bus on the device identification port from the master device.

16. The bus communications system of claim 1, wherein the external resistor is disposed between the slave device and the switch.

17. The bus communications system of claim 1, wherein the switch is disposed between the slave device and the external resistor.

18. The bus communications system of claim 1 configured to identify a synchronization stream to synchronize the slave device to the communications bus; wherein the device identification generation circuit is configured to detect the electrical characteristic of the communications bus signal received from the communications bus on the device identification port during identification of the synchronization stream.

19. The bus communications system of claim 1, wherein the master device comprises a Soundwire™ master device and the slave device comprises a Soundwire™ audio slave device.

20. The bus communications system of claim 19, wherein:
the communications bus comprises a Soundwire™ communications bus; and
the device identification generation circuit is configured to detect the electrical characteristic of the communications bus signal comprised of a Soundwire™ communications bus signal received from the Soundwire™ communications bus on the device identification port.

21. The bus communications system of claim 1, wherein the device identification generation circuit is configured to detect the electrical characteristic of the communications bus signal comprised of a communications bus clock signal received from the communications bus on the device identification port.

* * * * *